United States Patent
Willis

(10) Patent No.: US 6,771,437 B1
(45) Date of Patent: Aug. 3, 2004

(54) ATHERMAL OPTICAL BENCH

(75) Inventor: Chris L. Willis, Hollis, NH (US)

(73) Assignee: Bae Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 10/372,420

(22) Filed: Feb. 21, 2003

Related U.S. Application Data

(60) Provisional application No. 60/358,754, filed on Feb. 22, 2002.

(51) Int. Cl.⁷ ................................................ G02B 7/02
(52) U.S. Cl. ....................... 359/819; 359/811; 359/822; 359/823
(58) Field of Search ................................. 359/819, 822, 359/823, 813, 814, 811, 824

(56) References Cited

U.S. PATENT DOCUMENTS

| | | | |
|---|---|---|---|
| 3,700,313 A | 10/1972 | Karr et al. | |
| 3,814,365 A | 6/1974 | Mackenzie | |
| 3,897,139 A | 7/1975 | Caruolo et al. | |
| 3,966,309 A | 6/1976 | Mohler | |
| 4,268,123 A | * 5/1981 | Mesco ........................ | 248/488 |
| 4,675,874 A | 6/1987 | Pohler et al. | |
| 4,687,287 A | 8/1987 | Lukas et al. | |
| 4,805,177 A | * 2/1989 | Martin et al. .................. | 372/34 |
| 4,869,583 A | 9/1989 | Tiedje | |
| 4,893,899 A | 1/1990 | Huckenbeck | |
| 5,019,837 A | 5/1991 | Schwarz | |
| 5,170,409 A | 12/1992 | Nightingale et al. | |
| 5,177,644 A | 1/1993 | Stark | |
| 5,675,403 A | * 10/1997 | Cerrina et al. ................. | 355/75 |
| 5,710,788 A | 1/1998 | Werner | |
| 5,757,561 A | 5/1998 | Sechrist et al. | |
| 5,801,891 A | * 9/1998 | Lloyd ......................... | 359/871 |
| 5,930,057 A | 7/1999 | Sechrist et al. | |
| 6,016,230 A | 1/2000 | Nunnally et al. | |
| 6,022,005 A | * 2/2000 | Gran et al. .................. | 267/136 |
| 6,198,580 B1 | 3/2001 | Dallakian | |
| 6,304,393 B1 | 10/2001 | Sechrist et al. | |
| 6,480,347 B1 | 11/2002 | Spring | |

OTHER PUBLICATIONS

Griffith, Peter et al, Optical Mounts: Ignore The at Your Peril, Photonics Spectra, Sep. 1998, Laurin Publishing Co., Inc.

Newport Corporation, Application Note Opto–Mechanics 2, Fast Steering Mirror Technology: Active Beam Stabilization, Newport Corporation, 2001, Irvine, CA.

Newport Corporation, Opto–Mechanics, MFM Series—Flexure Industrial Optical Mounts (product catalog), pp. 610–611, Newport Corporation, Irvine, CA.

* cited by examiner

Primary Examiner—Ricky Mack
Assistant Examiner—Brandi Thomas
(74) Attorney, Agent, or Firm—Maine & Asmus

(57) ABSTRACT

Optical bench mounting and thermal management techniques are disclosed that enable increased dimensional stability. Output power, beam divergence, and boresight stability of the laser are thus maintained. A separate optical bench is pseudo semi-kinematically mounted to a chassis. A number of heat dissipation or heat management techniques can be utilized for heat generating components on the bench. For example, hot components (e.g., laser crystals) can be mounted on a cryo-cooler or other heat-pump, or attached to the chassis instead of the bench. Thermal loads can be balanced across the thickness of the bench to minimize bowing of the bench, and thermal strapping can be used to conduct heat away from hot components mounted on the bench to other locations (e.g., chassis or elsewhere) where the heat can be more efficiently handled. Thermal insulators and thermal damming can be used to inhibit heat flow from components into specific bench locations.

20 Claims, 15 Drawing Sheets

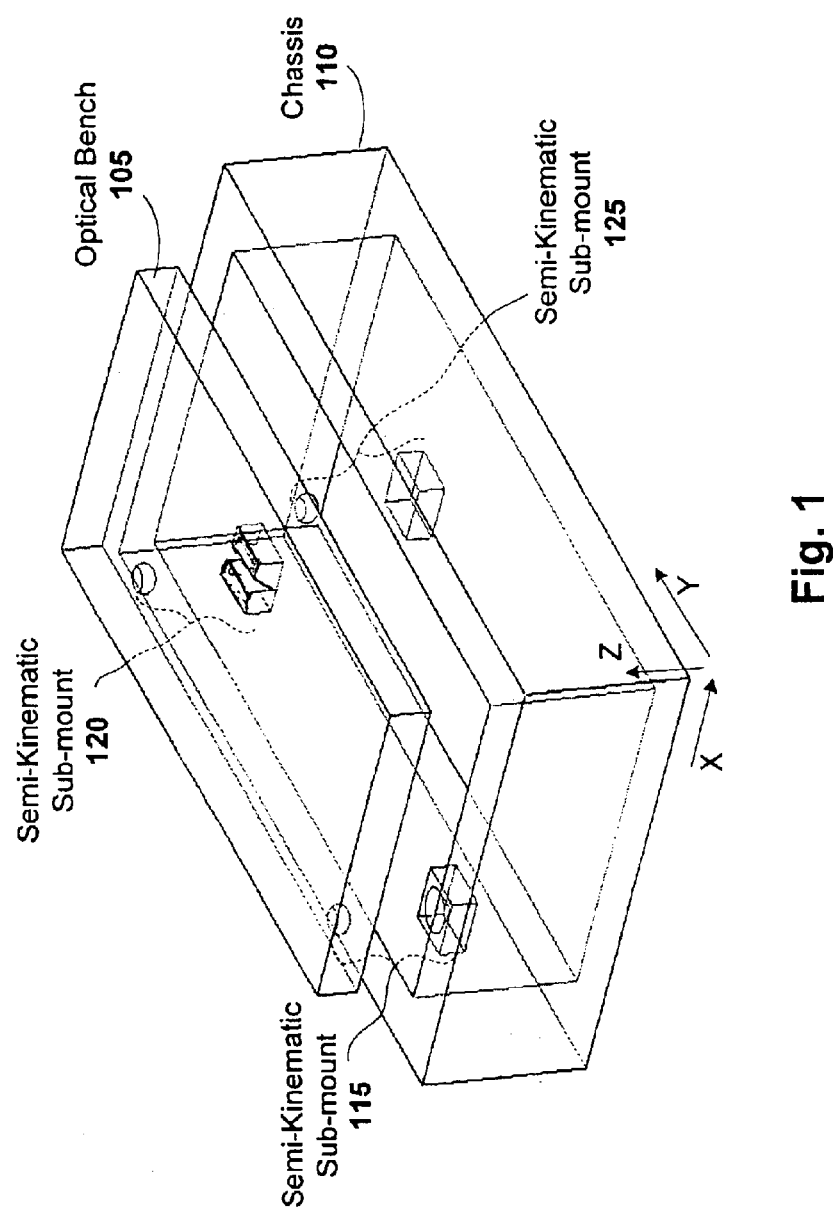

Optical Bench Mount Pad 460
Chassis Mount Pad 465

Flexure 470

Optical Bench 405
Pseudo Semi-Kinematic Sub-mounts 450

ATHERMAL OPTICAL BENCH

RELATED APPLICATIONS

This application claims the benefit of U.S. Provisional Application No. 60/358,754, filed Feb. 22, 2002. In addition, this application is related to U.S. application Ser No. 10/217,686, filed Aug. 12, 2002, and U.S. application Ser. No. 10/219,796, filed Aug. 15, 2002. Each of these applications is herein incorporated in its entirety by reference.

FIELD OF THE INVENTION

The invention relates to laser systems, and more particularly, to techniques for mounting an optical bench in a chassis, and for managing thermal and mechanical stresses associated with the bench.

BACKGROUND OF THE INVENTION

Generally, all lasers require a degree of thermal and mechanical stability to maintain output power, beam divergence, and mechanical boresight. Stability requirements are even higher in demanding applications, such as surveying and targeting. In particular, laser design involves balancing laser performance requirements against stability requirements associated with the laser's intended application, as well as balancing ease of manufacture and laser alignment complexity against stability requirements.

Ideally, lasers should be designed and manufactured with no adjustable components. With everything fixed, laser alignment would depend solely on the quality of the basic design. There would be no possibility of misalignment in the field. However, designs with no adjustable components (e.g., mounts) produce lasers with relatively broad tolerances and poor performance. Such designs are therefore not practical for demanding applications. Laser adjustment systems have been developed that result in acceptable laser alignment, but only at the cost of increased complexity and laser alignment labor. This problem is amplified for systems having high stability requirements, such as military systems.

In addition to alignment requirements, output beam boresight stability over a range of environmental and operational conditions must also be considered in laser design. A primary cause of poor boresight stability is mechanical motion of optical bench mounted components due to thermal loads caused not only by the surrounding environment, but also by the laser system itself.

In more detail, as internal temperature changes occur in a laser system, each of the system's components expands or contracts at its corresponding rate of thermal expansion. Neighboring components having different coefficients of thermal expansion are therefore subjected to differential thermal expansion. This differential thermal expansion, when left uncompensated, results in component movement as the system is exposed to temperature variation.

As such, the system's output beam deviates laterally and angularly, thereby changing the boresight alignment, resulting in an unreliable laser. In applications such as surveying, targeting, countermeasures, and alignment of machinery and buildings, such boresight instability is unacceptable. Yet, typical laser system designs fail to provide a comprehensive thermal load management scheme that systemically resolve tensions caused by differential thermal expansion. This has resulted in laser systems having inferior thermal stability ratings.

What is needed, therefore, are techniques for mounting and designing optical benches for laser systems that minimize the effects of thermal stress and thereby maintain output power, beam divergence and, in particular, mechanical boresight of the system's laser.

BRIEF SUMMARY OF THE INVENTION

One embodiment of the present invention provides a system for mounting a laser's optical bench to a chassis. The system includes a first pseudo semi-kinematic sub-mount that is adapted to constrain the optical bench in at least one translational direction, a second pseudo semi-kinematic sub-mount that is adapted to constrain the optical bench in two translational directions, and a third pseudo semi-kinematic sub-mount that is adapted to constrain the optical bench in at least two translational directions. The first, second, and third pseudo semi-kinematic sub-mounts operate together to form a pseudo semi-kinematic mount that constrains the optical bench in six degrees of freedom, without significant over constraint.

In one such embodiment, the first pseudo semi-kinematic sub-mount constrains the bench in one translational direction, and the third pseudo semi-kinematic sub-mount constrains the bench in three translational directions. For example, the first pseudo semi-kinematic sub-mount constrains the bench in the Z translational direction, the second pseudo semi-kinematic sub-mount constrains the bench in the X and Z translational directions, and the third pseudo semi-kinematic sub-mount constrains the bench in the X, Y and Z translational directions. Alternatively, the first pseudo semi-kinematic sub-mount constrains the bench in two translational directions, and the third pseudo semi-kinematic sub-mount constrains the bench in two translational directions. For example, each of the first, second, and third pseudo semi-kinematic sub-mounts constrains the bench in the X and Y translational directions.

One or more of the pseudo semi-kinematic sub-mounts may include a first optical bench mounting pad in surface contact with a first chassis mounting pad so that one or both of the first pads can slide with respect to the other. The sub-mount may further include a second mounting pad that is perpendicular to the first pads for providing a second translational constraint. Likewise, the sub-mount may further include a third mounting pad for providing a third translational constraint. One or more of the pseudo semi-kinematic sub-mounts may include a flexure device that constraints the optical bench in two or more translational directions and provides at least one degree of rotational freedom. One or more of the pseudo semi-kinematic sub-mounts may include a spring-loaded bolt fed through a clearance hole or slot and secured in a threaded hole. One or more of the pseudo semi-kinematic sub-mounts may include a Teflon shim to reduce friction between contacting surfaces.

Another embodiment of the present invention provides a system for mounting a laser's optical bench to a chassis. This particular system includes a first pseudo semi-kinematic sub-mount including a first optical bench mounting pad in surface contact with a first chassis mounting pad so that at least one flat contact surface of one or both of the first pads can slide with respect to the other. The system further includes a second pseudo semi-kinematic sub-mount including a second optical bench mounting pad in surface contact with a second chassis mounting pad so that at least one flat contact surface of one or both of the second pads can slide with respect to the other, and a third pseudo semi-kinematic sub-mount that is adapted to constrain the optical bench in at least two translational directions.

Another embodiment of the present invention provides a method for assembling a laser system including an optical bench adapted for mounting in a chassis. The method includes constraining the optical bench in the chassis in at least one translational direction with a first pseudo semi-kinematic sub-mount, constraining the optical bench in the chassis in two translational directions with a second pseudo semi-kinematic sub-mount, and constraining the optical bench in the chassis in at least two translational directions with a third pseudo semi-kinematic sub-mount. The first, second, and third pseudo semi-kinematic sub-mounts operate together to constrain the optical bench in six degrees of freedom, without significant over constraint.

The method may further include mounting a pair of hot elements on an outside wall and on opposite faces of the optical bench to balance thermal load on the bench. The pair of hot elements might include, for example, a laser crystal, a compensating heat source, and a pump diode. The method may further include mounting a hot element on the optical bench in a thermally dammed area, thereby forcing heat load from the hot element to exit to a known area of the optical bench. A heat dumping mechanism may be provided at the known area to dissipate the heat load. The method may further include mounting a hot component of the optical bench on a cooling device (e.g., cold finger), and plugging the cooling device into a chassis hole and through a clearance hole in the optical bench. The method may further include providing a heat strap to transfer unwanted heat to a heat dump.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1 illustrates an optical bench and chassis configuration that employs conventional semi-kinematic mount techniques.

DETAILED DESCRIPTION OF THE INVENTION

Figure 2A:
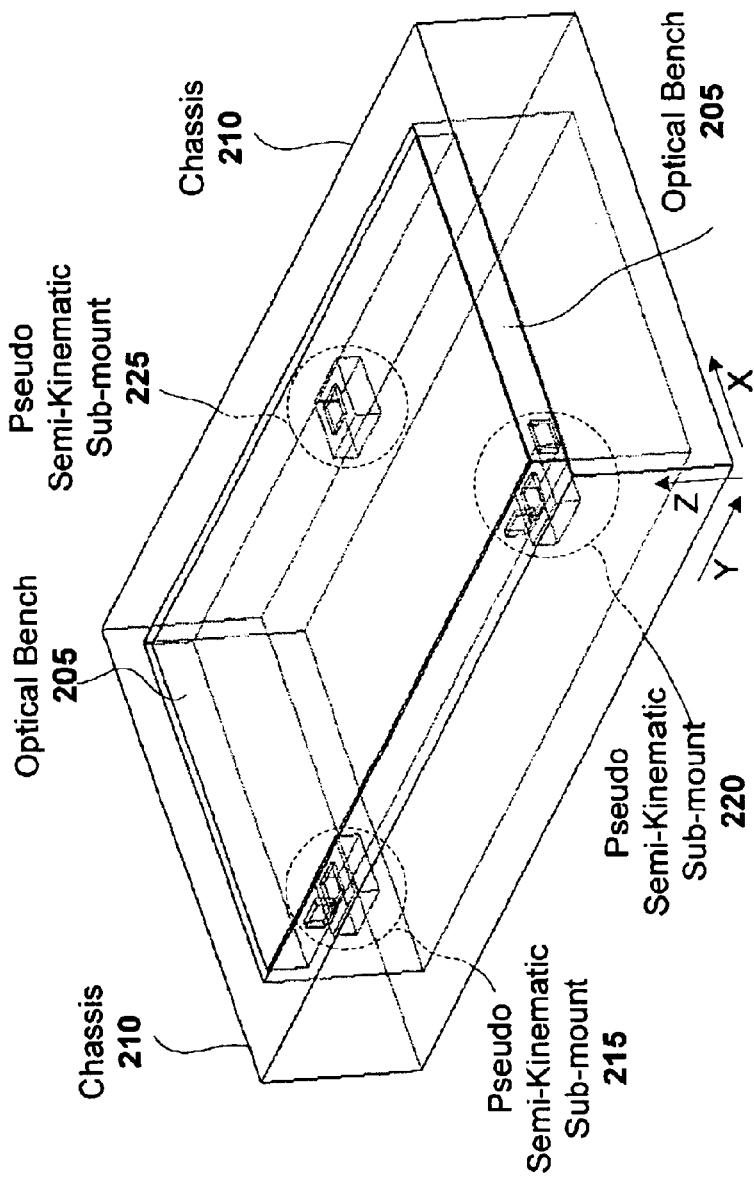
FIGS. 2a through 4c illustrate a system for mounting a laser's optical bench to a chassis utilizing a fully constrained, pseudo semi-kinematic mounting technique in accordance with embodiments of the present invention.

Optical bench mounting and thermal management techniques disclosed herein enable increased dimensional stability, thereby allowing output power, beam divergence, and boresight stability of the laser to be maintained.

A variety of embodiments can be derived from the principles underlying the present invention to provide efficient thermal load and stress management. Generally, the optical bench is thermally and mechanically isolated from its corresponding chassis by using a pseudo semi-kinematic mounting scheme to secure the bench onto the chassis. By managing the heat loads of the system, mechanical deformation that impact the boresight stability and output power of the optical beam can be controlled.

Managing the heat loads may include, for example, one or more or the following cryo-cooling heat generating components, positioning heat generating components to spatially balance the respective heat loads, moving heat loads from the optical bench to the chassis, adding compensating heat sources to bring the system into balance, insulating components from the optical bench to reduce the impact of a source, thermally strapping a heat source to a location off the optical bench (e.g., to the chassis or elsewhere), and using insulators and thermal damming to slow the flow of heat from hot components into the optical bench at specific points.

Kinematic Mounting: Semi and Pseudo Semi

Manufacturing an optical bench separate from its chassis has a number of non-trivial advantages over a bench made integral to a chassis. For example, the bench and chassis can be assembled simultaneously. In particular, the chassis can be fitted with items such as a wiring harness, diodes, heat exchangers, and other components, while the optical bench is fitted with all the components in its optical train, and then pre-aligned in a fixture that emulates the chassis. Such simultaneous assembly reduces overall manufacturing times.

In addition, mechanical features can be more easily machined into a separate optical bench, which can be manipulated on all sides by milling machines and other related tooling mechanisms. In contrast, an optical bench machined or cast as a part of a chassis is typically associated with lower complexity because of limited machining access. Required complexities are therefore forced into the mount design, which typically translates to lower stability of the overall design.

An optical bench manufactured separately from the chassis of a laser system (as opposed to being integral to the chassis) can be mounted on a chassis employing kinematic principles to help thermally and mechanically isolate the bench from the chassis, thereby minimizing the stress-related effects on the laser system.

Kinematic mounting of components involves the theory of constraining six degrees of freedom when attaching one object to another. The six degrees of freedom include translation in the X, Y, and Z directions, and rotation in the X, Y, and Z directions. The term semi-kinematic is used to describe the practice of this theory, because the joints achieved are not truly frictionless. Semi-kinematic mounting can be used, for example, to mount optical components in a particular setup.

Generally, conventional semi-kinematic mounting techniques rely on low friction contact between hardened steel balls on one side and cones, flats, and grooves on the other. The most common semi-kinematic mount includes three types of mountings, which are a ball in a cone, a ball in a v-groove, and a ball on a flat. Springs are added to secure the assembly together.

FIG. 1 illustrates an optical bench and chassis configuration that employs conventional semi-kinematic mounting techniques. The optical bench 105 is configured with three steel balls (shown on the underside of the bench), and the chassis 110 is configured with three corresponding portions—a flat, a v-groove, and a cone. The cone and one ball form semi-kinematic sub-mount 115, the v-groove and its corresponding ball form semi-kinematic sub-mount 120, and the flat and its corresponding ball form semi-kinematic sub-mount 125.

Sub-mount 115 is constrained in the X, Y, and Z translation directions, sub-mount 120 is constrained in the X and Z translation directions, and sub-mount 125 is constrained in the Z translation direction. When the constraints associated with each of these sub-mounts are taken together, they form a semi-kinematic mount the provides exactly six degrees of freedom. As such, the bench is afforded a degree of mechanical flexibility by being fully constrained, but not over constrained, except to the degree of the minimal friction present in such a system.

However, such conventional semi-kinematic mounting techniques are not always desirable, particularly in applications where the object being mounted has substantial mass. Moreover, semi-kinematic mounting techniques can be problematic in a dynamically harsh environment. For example, the ball joints described above have low load capacity and a relatively large volume. Under shock or other kinds of loading, the contact point or line on the surface that mates with the ball can deform.

In cases where a ball-and-something type semi-kinematic mounting scheme would be problematic, a larger surface area of contact, such as a flat, is desirable. A sliding flat surface to flat surface contact is referred to herein as a pseudo semi-kinematic sub-mount (or a portion of such a sub-mount). Such a sub-mount approximates the functioning of a semi-kinematic sub-mount, but has a higher degree of surface contact. As such, a pseudo semi-kinematic mount (comprised of three or more pseudo semi-kinematic sub-mounts) has a higher degree of friction and a lower degree of point loading. Thus, frictional conditions and tolerances associated with a pseudo semi-kinematic mount should be considered for acceptability, given a particular application.

Pseudo Semi-Kinematic Mounted Optical Bench

FIGS. 2a through 4c illustrate a system for mounting a laser's optical bench to a chassis utilizing a fully constrained, pseudo semi-kinematic mounting technique in accordance with embodiments of the present invention. The system of each figure includes an optical bench that is non-integral to a chassis. For purposes of simplification, the optics, componentry, and other extraneous detail of the optical bench 305 and chassis 310 are not shown.

As can be seen in the perspective view depicted in FIG. 2a, an optical bench 205 is pseudo semi-kinematically mounted to a chassis 210. There are three pseudo semi-kinematic sub-mounts 215, 220, and 225. Sub-mount 215 constrains the bench 205 in the X and Z translation directions, sub-mount 220 constrains the bench 205 in the X, Y and Z translation directions, and sub-mount 225 constrains the bench 205 in the Z translation direction. A number of functional benefits associated with such a pseudo semi-kinematic mounting will be apparent.

For example, there are no point or line contact loads, and the thermal pathway between the bench 205 and the chassis 210 is limited to the mounting pads. In addition, mechanical distortions from the chassis 210 are isolated from the optical bench 205 by virtue of the six degrees of constraint with no significant over constraint provided by the pseudo semi-kinematic mounting scheme. Thus, alignment of optical bench 205 will be maintained while allowing chassis 210 to thermally expand, contract and deform under the influence of environment conditions.

Figure 2B:
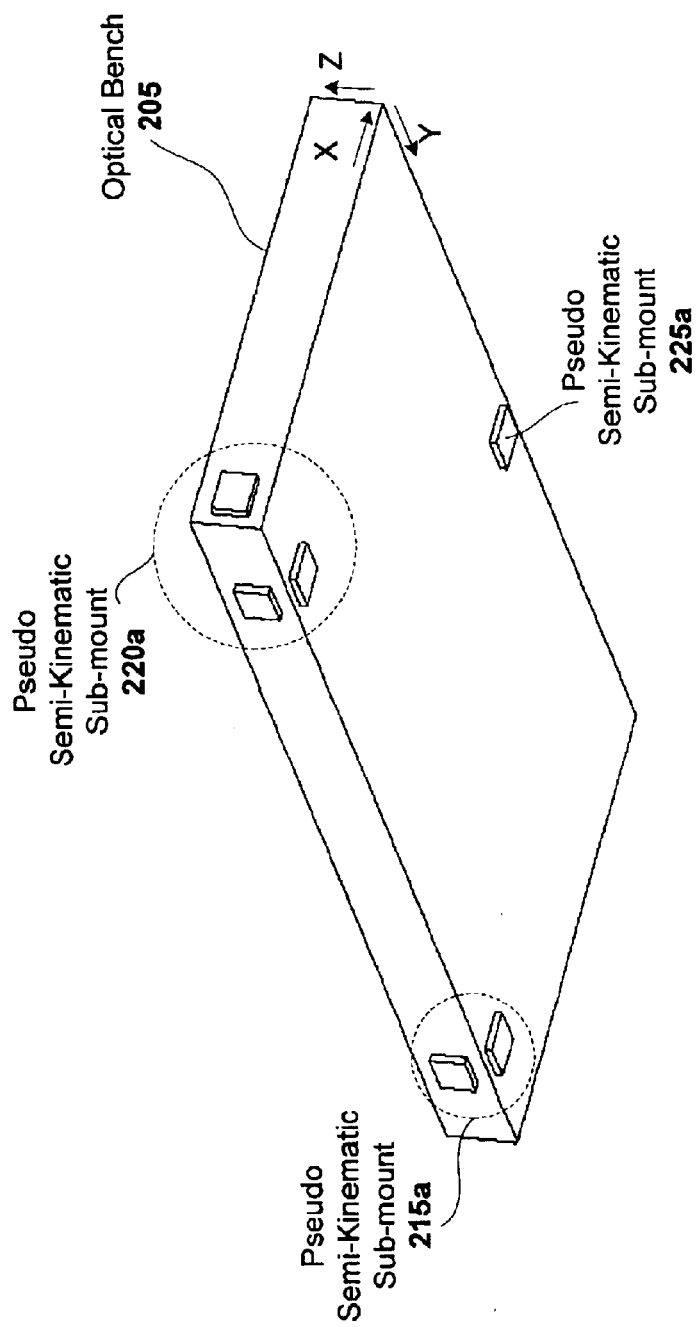

FIG. 2b illustrates the underside of the optical bench 205 of FIG. 2a, including the bench mounting pads associated with each of the pseudo semi-kinematic sub-mounts 215, 220, and 225. In particular, the bench portion of the sub-mount 215 is designated as 215a, and includes an X mounting pad and a Z mounting pad. The bench portion of sub-mount 220 is designated as 220a, and includes an X mounting pad, a Y mounting pad, and a Z mounting pad. The bench portion of sub-mount 225 is designated as 225a, and includes a Z mounting pad.

In one embodiment, the bench is about 10 to 12 inches long (along Y), about 3 to 6 inches wide (along X), and about 1 to 2 inches high (along Z). Given such dimensions, each mounting pad can be, for example, about 0.5 to 1 inches square, and secured to the bench 205 via an epoxy or other suitable bonding agent. Alternatively, the pads are integral to the bench. The pads can be made of the same material that the bench is made from (e.g., steel, titanium, aluminum), but need not be. Note that other materials and dimensions, as well as other constraint configurations, will be apparent in light of this disclosure, and the present invention is not intended to be limited to any one such embodiment.

Figure 3A:
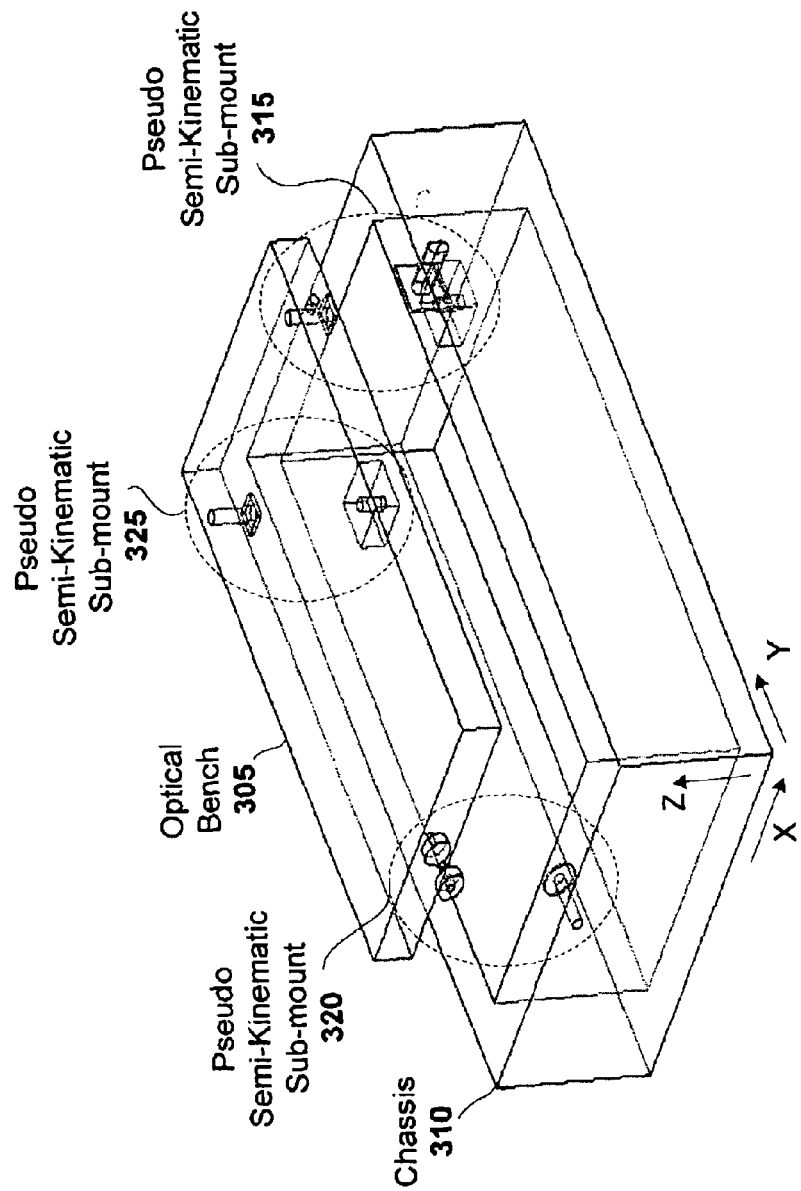

FIG. 3a illustrates an optical bench 305 that is pseudo semi-kinematically mounted to a chassis 310 by sub-mounts 315, 320, and 325. Sub-mount 315 constrains the bench 305 in the X and Z translation directions, sub-mount 320 constrains the bench 305 in the X, Y and Z translation directions, and sub-mount 325 constrains the bench 305 in the Z translation direction.

Sub-mounts 315 and 325 employ mounting pads, while sub-mount 320 employs a machined flexure device that provides pseudo semi-kinematic qualities. In addition, each sub-mount is associated with a clearance hole or slot, and a corresponding threaded hole adapted to receive a fastening device (e.g., bolt and screw). Note that the threaded hole can be in either the bench 305 or the chassis 310. Likewise, the mounting pads that constrain in the X translation direction can be mounted on either the bench 305 or the chassis 310. The particular configuration of clearance holes/slots, threaded holes, and pads was selected to facilitate visual clarity.

As with the embodiment of FIGS. 2a–b, there are no point or line contact loads, and the thermal pathway between the bench 305 and the chassis 310 is limited to the contact area associated with each sub-mount. In addition, mechanical distortions from the chassis 310 are isolated from the bench 305 by virtue of the six degrees of constraint with no significant over constraint provided by the pseudo semi-kinematic mounting scheme. Thus, alignment of bench 305 will be maintained while allowing chassis 310 to thermally expand, contract and deform under the influence of environment conditions.

Figure 3B:
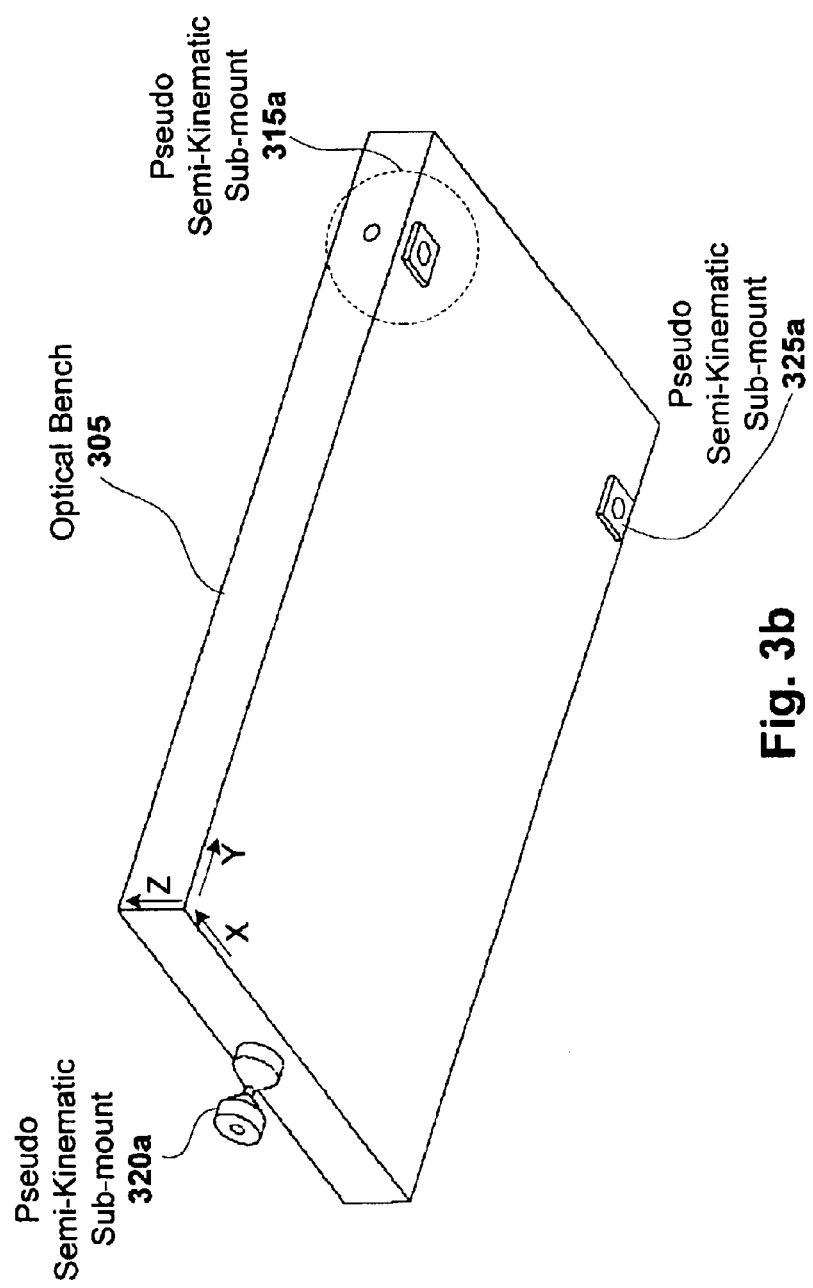

FIG. 3b illustrates the underside of the optical bench 305 of FIG. 3a, including the bench mounting pads/devices associated with each of the pseudo semi-kinematic sub-mounts 315, 320, and 325. In particular, the bench portion of sub-mount 315 is designated as 315a, and includes an X threaded hole and a Z mounting pad configured with a clearance hole. The bench portion of sub-mount 320 is designated as 320a, and includes a machined flexure device configured with a threaded hole. The bench portion of sub-mount 325 is designated as 325a, and includes a Z mounting pad, also configured with a clearance hole. In an alternative embodiment, the X mounting pad of the pseudo semi-kinematic sub-mount 315 is on the bench 305 rather than the chassis 310, and the corresponding threaded hole is in the chassis 310.

The discussion in reference to FIGS. 2a–b relevant to bench and pad dimensions, materials, and bonding agents equally applies here. The flexure device in this embodiment is an hourglass-shaped device, where one end can be bonded to the bench 305 with a bonding agent such as epoxy. The threaded hole at the other end of the flexure is adapted to receive a bolt or screw.

In one embodiment, the flexure is made of titanium, but other spring materials (e.g., steel, beryllium copper, aluminum) can be used here as well. Generally, the flexure constrains the bench in the X, Y, and Z translation directions, but allows rotation about X, Y, and Z. In addition, the flexure device necks down to a thin portion at its center, which provides a path of relatively higher thermal resistance. As such, a heat load located on the chassis 310 near the flexure contact surface area will be inhibited from transferring to the bench 305 via the flexure.

Variations on this flexure configuration will be apparent. For example, the flexure can be machined so that it constrains the bench in only two translational directions instead of three. Likewise, the flexure can be machined to have a different shape that facilitates the desired constraints.

Figure 3C:
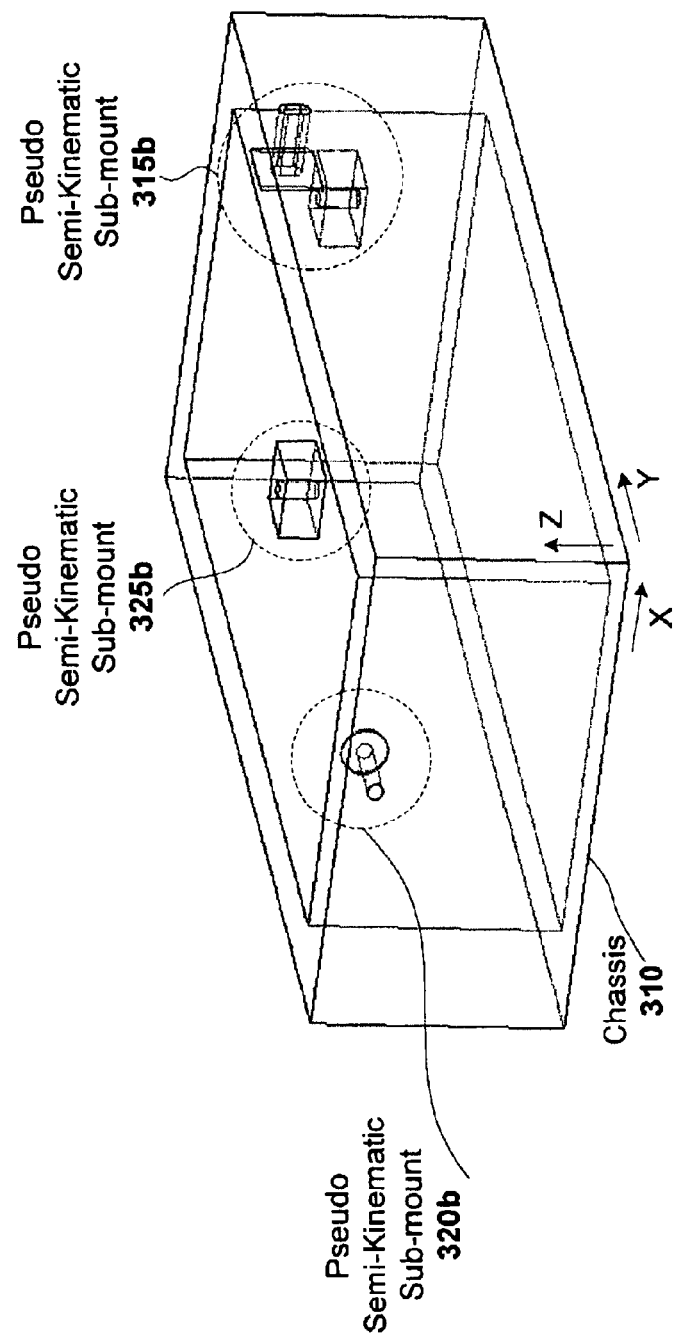

FIG. 3c illustrates a perspective view of the chassis 315 of FIG. 3a, including the chassis mounting pads/locations associated with each of the pseudo semi-kinematic sub-mounts 315, 320, and 325. In particular, the chassis portion of sub-mount 315 is designated as 315b, and includes an X clearance slot and corresponding X mounting pad, and a Z mounting pad configured with a threaded hole. The chassis portion of sub-mount 320 is designated as 320b, and includes a clearance hole and a contact surface adapted to receive the machined flexure device. The chassis portion of sub-mount 325 is designated as 325b, and includes a Z mounting pad configured with a threaded hole.

Recall that the X mounting pad of sub-mount 315 can be mounted on the bench 305 rather than the chassis 310. In such an embodiment, the corresponding threaded hole would be in the chassis 310. In either case, the clearance slot extends through the X mounting pad. In addition, the chassis contact surface adapted to receive the flexure can be counterbored so the end portion of the flexure seats into the counterbore. Alternatively, the end portion of the flexure can simply abut the flat portion of the chassis wall (i.e., no counterbore).

Figure 3D:
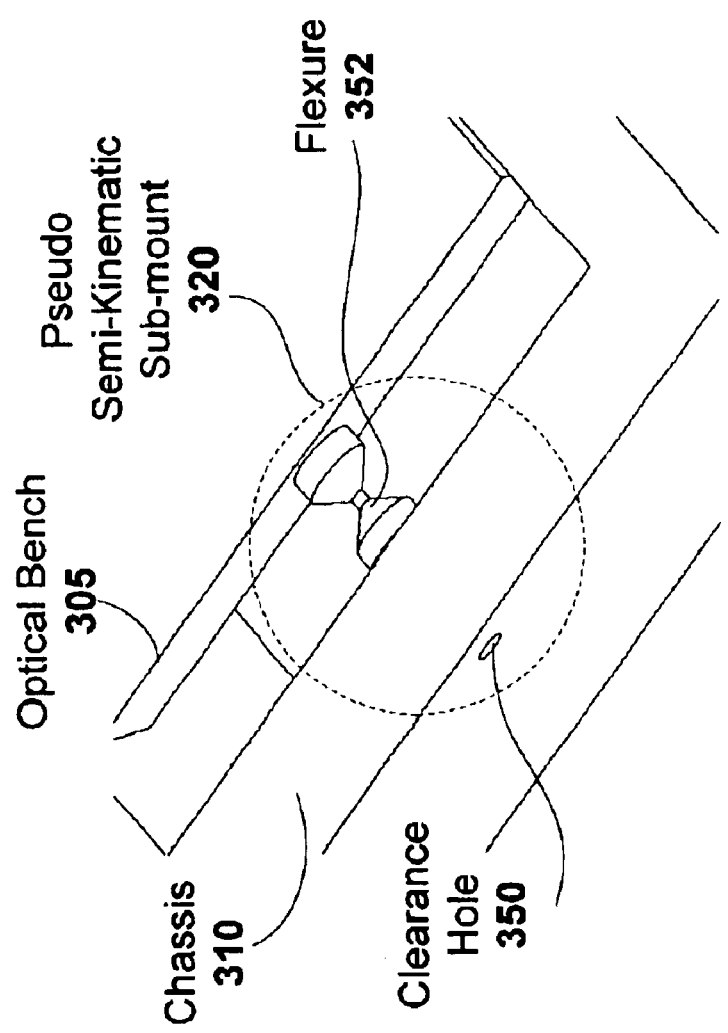

FIG. 3d illustrates an expanded view of the pseudo semi-kinematic sub-mount 320. As can be seen, a flexure 352 mechanically and thermally couples the optical bench 305 to the chassis 310. The first end of flexure 352 can be bonded to the flat surface of the bench 305, or seated in a counterbore in the bench wall. The second end of the flexure 352, which is adapted with a threaded hole, is abutted to the chassis wall. Alternatively, the second end can be seated into a counterbore.

A threaded bolt or other suitable fastener can be fed through the clearance hole 350, so that the threads of the bolt engage the threaded hole in the second end of the flexure 352. A spring or similar device (e.g., belleville washer) can be included between the head of the bolt and the outside chassis wall to flexibly apply the given constraint, thus preventing over constraining. The flexure 352 provides three degrees of rotational freedom $-\theta_X$, $\theta_Y$, and $\theta_Z$, while constraining X, Y, and Z translation. Recall that flexure 352 can be machined to provide other constraint schemes as well, as will be apparent to one of ordinary skill.

In one embodiment, the flexure 352 is made of titanium, and is about one to two inches long (from end to end). The diameter of each end portion is about one-quarter to three-quarter inches, while the necked down middle portion can be about one to three sixteenths of an inch. Numerous configurations can be applied here, with the specific material and dimensions depending on the particular application, including the bench mass, chassis mass, and desired degree of rotational flexibility. The present invention is not intended to be limited to any one such configuration.

Figure 3E:
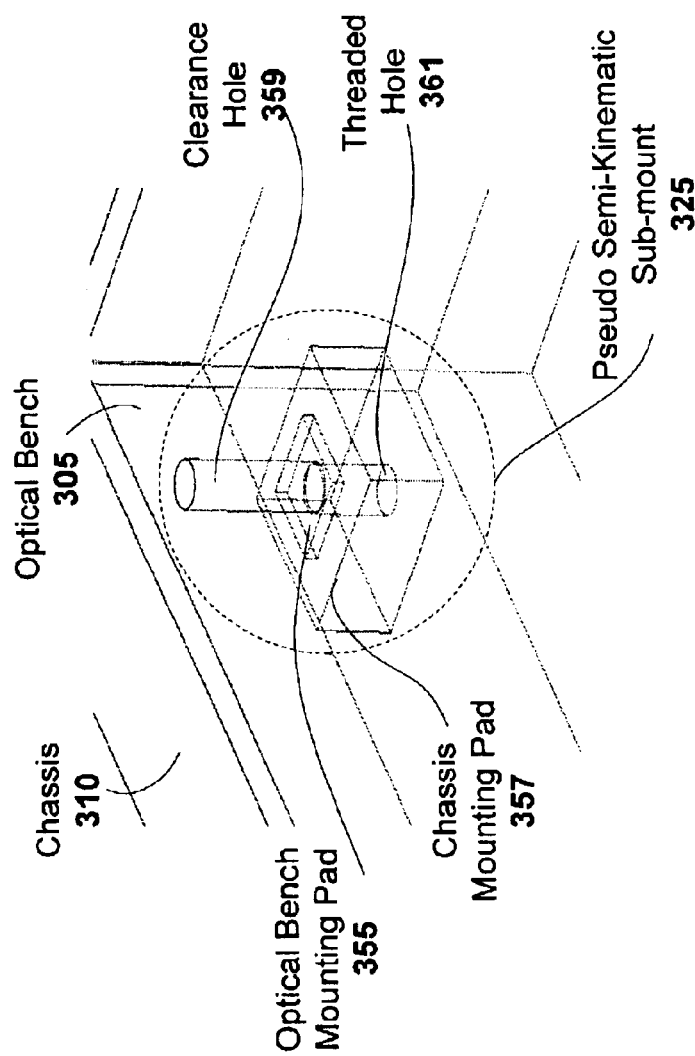

FIG. 3e illustrates an expanded view of the pseudo semi-kinematic sub-mount 325. This particular sub-mount includes an optical bench mounting pad 355, and a relatively larger chassis mounting pad 357. One or both of the pads can slide with respect to one another, thereby forming a pseudo semi-kinematic sub-mount in accordance with the principles of the present invention.

In addition, the pad 357 of chassis 310 includes a threaded hole, and a clearance hole 359 travels through bench 305 and the bench pad 355. A threaded bolt or other suitable fastener can be fed through the clearance hole 359, so that the threads of the bolt engage the threaded hole in the chassis mounting pad 357. A belleville washer or other suitable spring device can be included between the head of the bolt and the outside bench surface to flexibly apply the given constraint, thus preventing over constraining.

Note that the bolt does not directly contact the bench 305 by virtue of the clearance hole 359 and the spring device. Further note that the head of the bolt can be sunk into surface (e.g., via a counterbore) of the bench 305 if so desired. This pseudo semi-kinematic sub-mount 325 provides 325 provides X and Y translational freedom, as well as $\theta_Z$ rotational freedom, while constraining translation in Z and rotation about X and Y.

Figure 3F:
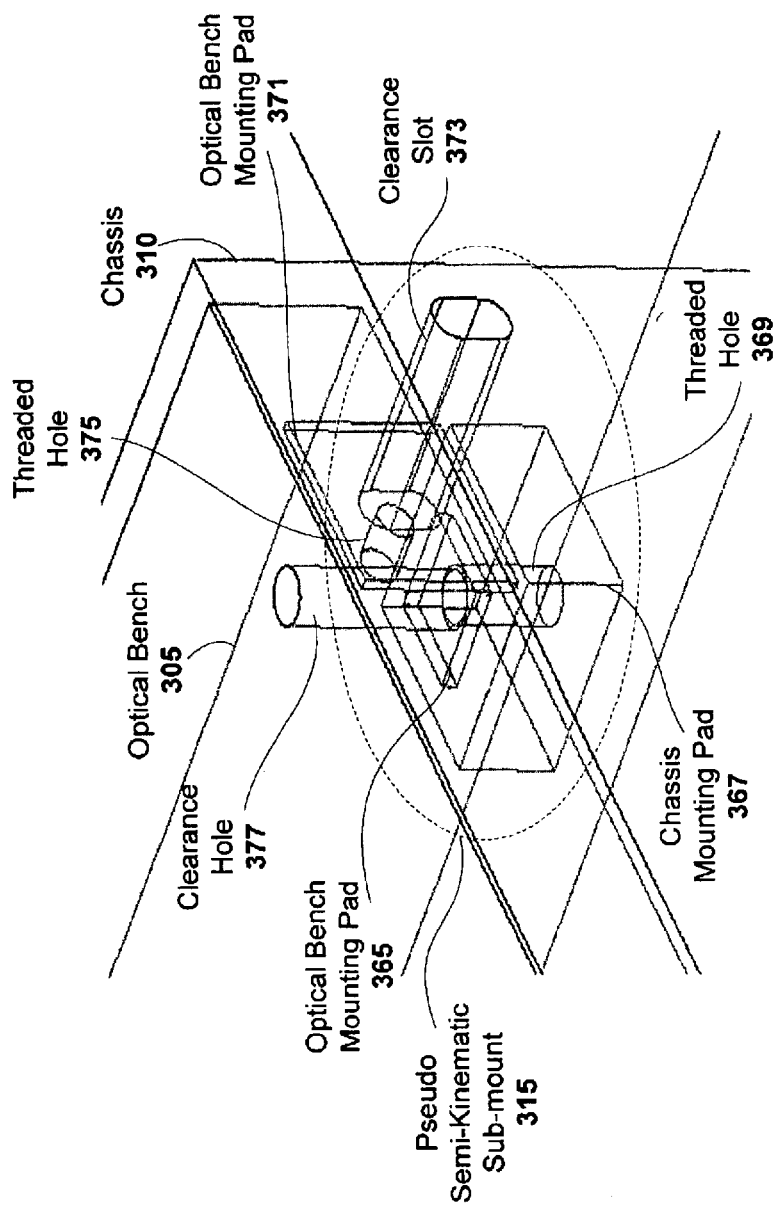

FIG. 3f illustrates an expanded view of the pseudo semi-kinematic sub-mount 315. As can be seen, this sub-mount includes an optical bench mounting pad 365, a relatively larger chassis mounting pad 367, and a optical bench mounting pad 371 (also could be a chassis mounting pad). One or both of the pads 365 and 367 can slide with respect to one another, and pad 371 slides with respect to the relatively larger surface of the chassis wall (assuming the pad is on the bench 305). Pad 371 is essentially perpendicular to pads 365 and 367.

The pad 367 of chassis 310 includes a threaded hole, and a clearance hole 377 travels through bench 305 and the bench pad 365. A threaded bolt or other suitable fastener can be fed through the clearance hole 377, so that the threads of the bolt engage the threaded hole in the chassis mounting pad 367. A spring device can be included between the head of the bolt and the outside bench surface as previously explained to prevent over constraining.

In addition, a clearance slot 373 travels through the chassis 310 and mounting pad 371. In this particular embodiment, a threaded hole 375 is provided in the bench 305, so that a bolt can be fed through slot 373 and secured in hole 375. A spring mechanism may be used between the head of the bolt and the chassis wall. Note that the bolt does not directly contact the chassis 310 by virtue of the clearance slot 373 and the spring device. Further note that the head of the bolt can be sunk into surface of the chassis 310 via a counterbore if so desired.

Recall that the relationship between slot 373 and hole 375 can be reversed. In such an embodiment, a portion of the bench 305 could be cut or otherwise machined away to provide a space so that a bolt could be fed into the slot 373 formed in the bench wall. The corresponding threaded hole 375 would be formed on the inside of the chassis wall. Again, the bolt could be counter-sunk and/or spring-loaded.

This pseudo semi-kinematic sub-mount 315 provides Y translational freedom, as well as $\theta_Z$ rotational freedom, while constraining translation in X and Z, and rotation about X and Y.

Figure 3G:
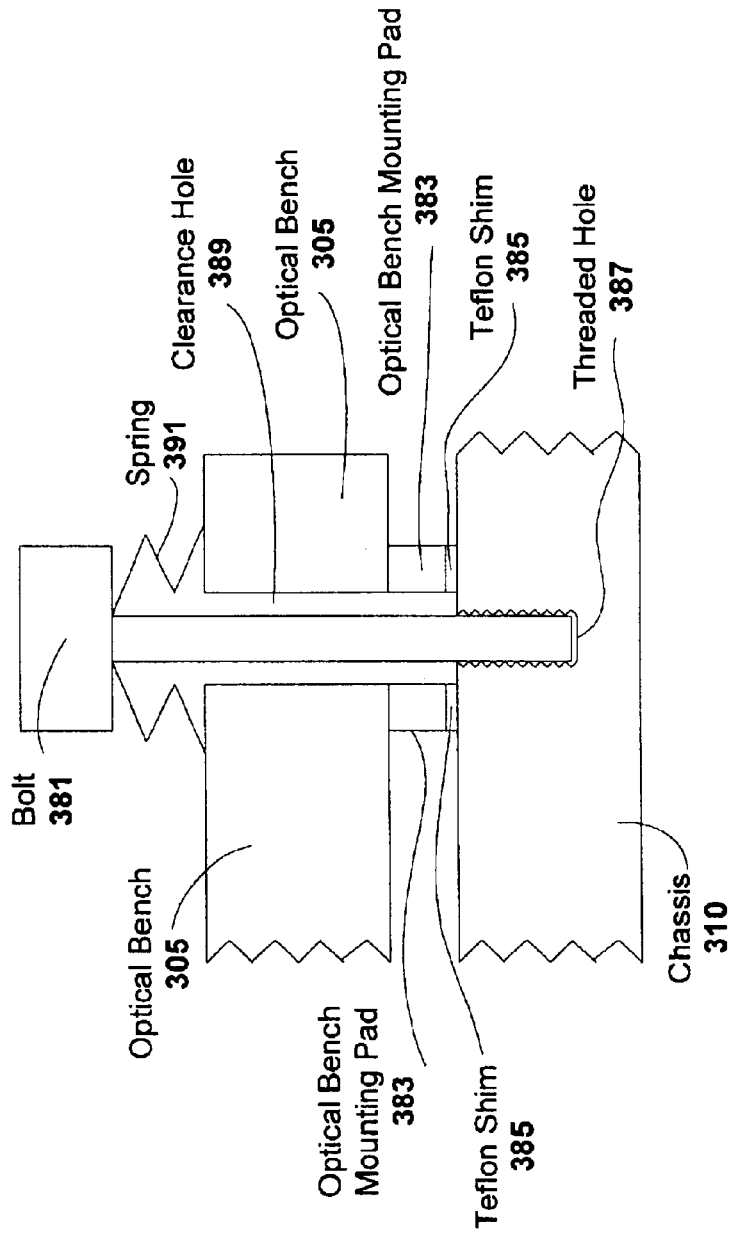

FIG. 3g illustrates a side view of a pseudo semi-kinematic sub-mount having a spring-loaded bolt arrangement. Such a configuration might be used in an application, for example, where the optical bench and chassis have substantial mass, and the flexibility associated with the spring-loaded bolt allows at least one degree of translational and/or rotational freedom.

As can be seen, an optical bench mounting pad 383 is provided on bench 305. A clearance hole 389 is provided through the bench 305 and pad 383. A bolt 381 is fed through the clearance hole 389, and received by a corresponding threaded hole 387 provided in the chassis 310 (e.g., in a chassis mounting pad). A spring device 391 is provided between the head of the bolt 381 and the bench 305, and a Teflon shim 385 is provided between the pad 383 and the chassis 310. A torque wrench can be used to set the tension in the spring-loaded bolt 381, based on factors such as the bench mass and the desired degree of force operating on the bench 305.

The pad 383 can be machined as part of the bench 305, or can be made separately and bonded to the bench as previously discussed. The shim 385 is used to reduce friction and stiction between flat contacting surfaces of the sub-mount, thereby facilitating the at least one degree of translational and/or rotational freedom associated with the sub-mount. In one embodiment, Teflon shims ranging from 0.0005 to 0.001 inches thick are used between sliding flat contact surfaces. Note, however, that the shim 385 is not necessarily required to practice the present invention, and the other friction reducing technologies can be used here as well.

Further note that a pseudo semi-kinematic sub-mount in accordance with the principles of the present invention does not require a bolt, spring, or other additional fastening mechanisms. Rather, a pseudo semi-kinematic sub-mount can be formed by two flat contact surfaces (e.g., pads or other flats), where one or both of those surfaces can slide with respect to the other surface, or otherwise provide at least one degree of translational and/or rotational freedom. No point or line contact is used, thereby avoiding problems associated with conventional semi-kinematic mounting techniques.

Further note that a single pseudo semi-kinematic sub-mount can be formed by multiple sets of mating flat surfaces, where each set can exist in a plane that is different from the other sets. For example, one set of flat contact surfaces can mate in the horizontal plane, while a second set of flat contact surfaces can mate in the vertical plane. In this sense, the first set is perpendicular to the second set. Other angular relationships between multiple sets of mating surfaces will be apparent in light of this disclosure.

Figure 4B:
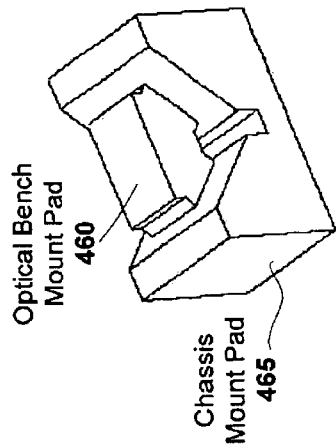
Figure 4C:
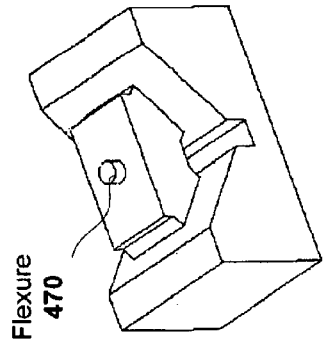
Figure 4A:
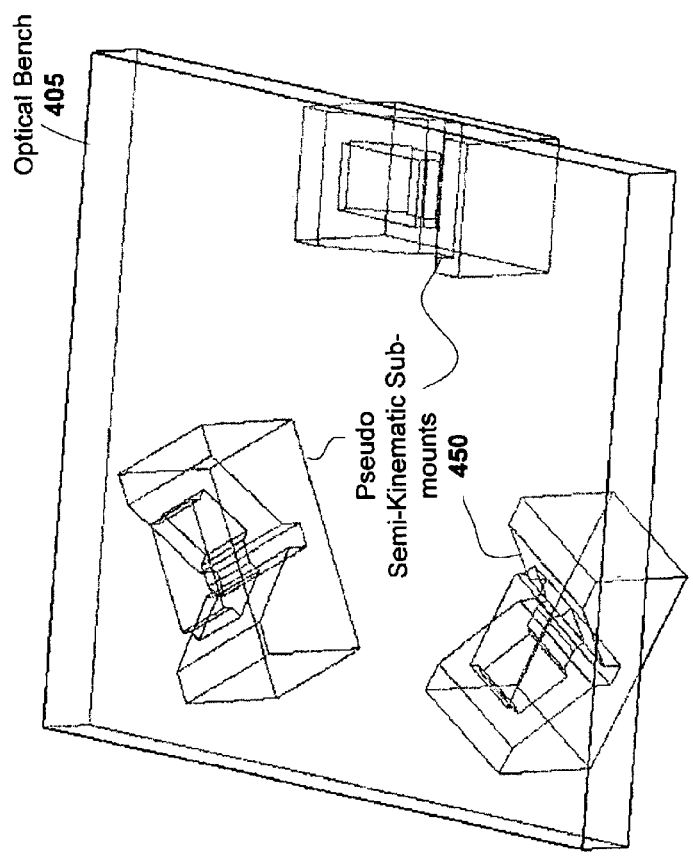

FIGS. 4a–c illustrate an alternate pseudo semi-kinematic mounting technique in accordance with another embodiment of the present invention. Here, the optical bench 405 is mounted to the chassis (not shown) via three pseudo semi-kinematic sub-mounts 450. As shown in FIG. 4b, each sub-mount includes an optical bench mount pad 460, and a chassis mount pad 465.

Each chassis mount pad 465 includes a v-groove, and each optical bench mount pad 460 includes a pair of flats that correspond to the v-groove of the chassis mount pad 465. Each sub-mount 450 provides constraints in the X and Y translational directions. In addition, assuming that the bench 405 has sufficient mass and is large enough (relative to the sub-mounts 450), each sub-mount 450 allows a small, but not insignificant rotational freedom about Z. Residual over constraint can be removed by adding a flexure 470 that allows more rotation at each sub-mount as shown in FIG. 4c. The flexures 470 can be bonded, otherwise fastened (e.g., threaded hole and bolt arrangement), or machined directly into the underside of the bench 405.

Thermal Load and Stress Management

To complement a non-integral optical bench that is pseudo semi-kinematically mounted to a laser system chassis, a thermal load and stress management scheme can be implemented. As military applications typically require the strictest specifications, the description herein will be given in a military context. However, other applications will be apparent in light of this disclosure.

For a laser system in a military application, the typical boresight stability requirement is between 100 and 300 microradians. To achieve this level of stability, assume that thermal loads over ten watts must be carefully handled. Loads under five watts can usually be ignored, and loads in the range of 5 to 10 watts must be assessed to determine if they need special handling. Thermal loads in the 5 to 10 watt range that have been determined to be a problem and all loads over 10 watts are handled by using the techniques described in the following paragraphs.

These wattage ranges are not intended as a limitation on the present invention. Rather, they are provided as an example guide when assessing a number of thermal loads associated with a given laser system. In general, any thermal load, regardless of its wattage, can be handled or otherwise considered in the thermal load and stress management scheme to ensure optimal performance of the system.

Spatially Balancing Thermal Loads of Optical Bench

In one embodiment of the present invention, spatially balancing thermal loads on the optical bench, including on either side of the bench, is employed for the thermal loads associated with hot components such as laser crystals, Q-switches, absorbers (e.g., beam dumps), and solenoids and motors.

Figure 5:
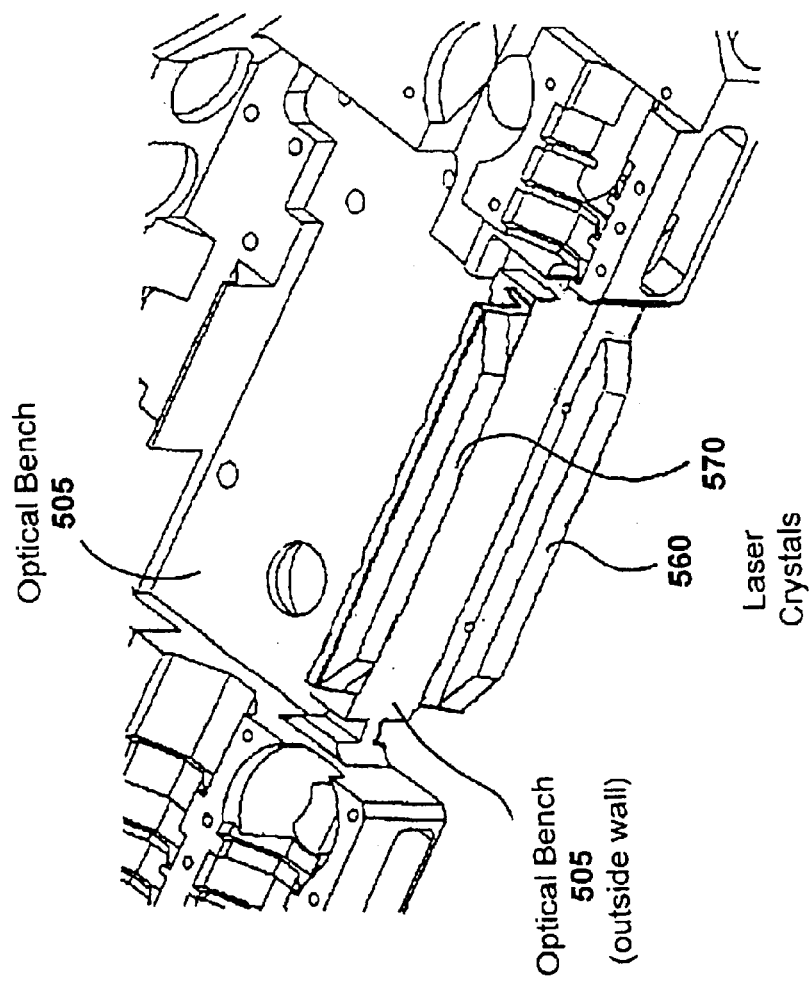
FIG. 5 illustrates hot elements mounted near the outside wall and on opposite faces of the optical bench to balance the thermal load on the bench, and to place the waste heat where it can be channeled away to the chassis or an external heat exchanger in accordance with an embodiment of the present invention.

FIG. 5 illustrates hot elements mounted near the outside wall and on opposite faces of the optical bench to balance the thermal load on the bench, and to place the waste heat where it can be channeled away to the chassis or an external heat exchanger in accordance with an embodiment of the present invention. In this particular example, the hot elements are two laser crystals 560 and 570 of a slab laser. Assume each crystal generates about 10 to 20 watts of waste heat, depending upon the mode of operation. Note, however, that the hot components could be any optical subassemblies or other devices which by necessity must be mounted proximal to or on the optical bench in order for the laser to function.

The two laser crystals 560 and 570 are mounted on L-brackets, which are mounted on opposing sides of an optical bench 505 outside wall. Balancing the thermal loads in this way keeps the temperature gradients in the plane of bench 505, thereby inhibiting the bench 505 from bowing and taking a bowl shape. As such, boresight error associated with the laser system is minimized or otherwise eliminated. Numerous thermal balancing schemes are possible here, and actual positioning of the hot elements will depend on factors such as the layout of the bench (e.g., dimensions and material) and the wattage of heat loads being balanced.

Thermal Damming and Heat Pumping

Figure 6:
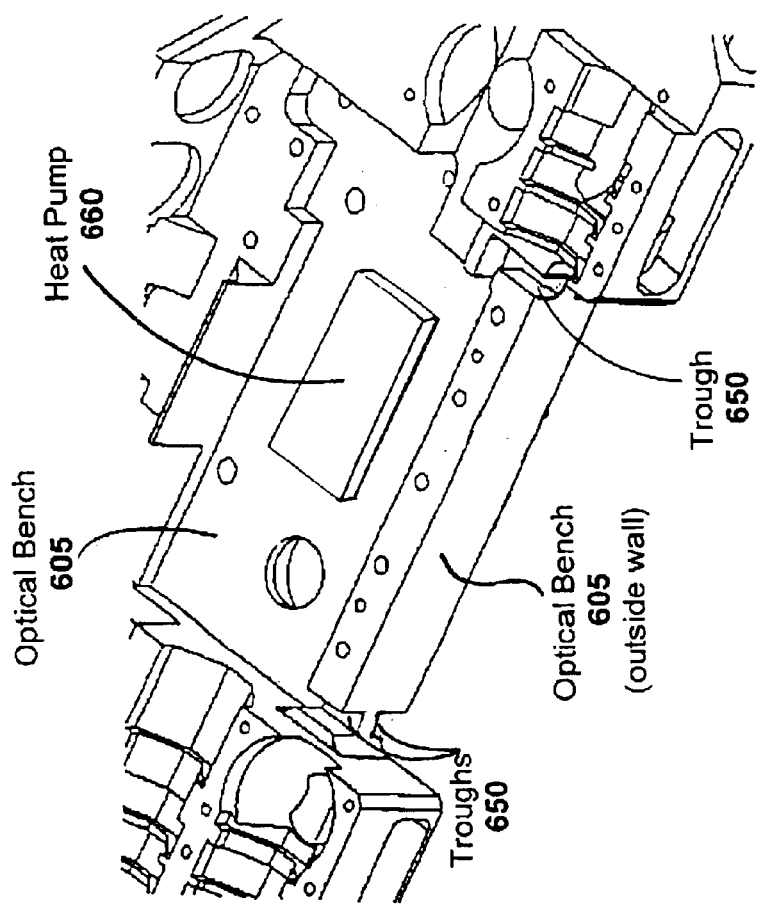
FIG. 6 illustrates thermally damming a hot element on one side of an optical bench in accordance with an embodiment of the present invention.

FIG. 6 illustrates thermally damming a hot element on one side of an optical bench in accordance with an embodiment of the present invention. In thermal damming, troughs 650 are cut or otherwise machined around the mounting area of a hot component. In this particular example, the outside wall of optical bench 605 is where two laser crystals could be mounted (as shown in FIG. 5).

The troughs 650 at each end of the mounting area, and on both sides of optical bench 605, provide a path of higher thermal resistance thereby inhibiting heat transfer. As such, the generated heat load is forced to exit the mounting area toward the center of the optical bench 605, where it can be more effectively managed or otherwise dissipated by a heat pump 660 or other heat dumping mechanism (e.g., heat sink). In this sense, the heat load generated by the laser crystals is thermally dammed.

The heat pump 660 can be, for example, a thermoelectric cooler or a cryo-cooler, such as a Stirling Cycle Cooler or Joule Thompson Cooler. In an alternative embodiment, a heat path (e.g., a heat pipe or a thermal mass) can be used instead of heat pump 660. A heat exchanger or a combination of a heat exchanger and heat pump could also be used here.

Cryo-Cooler Dewar

Figure 7:
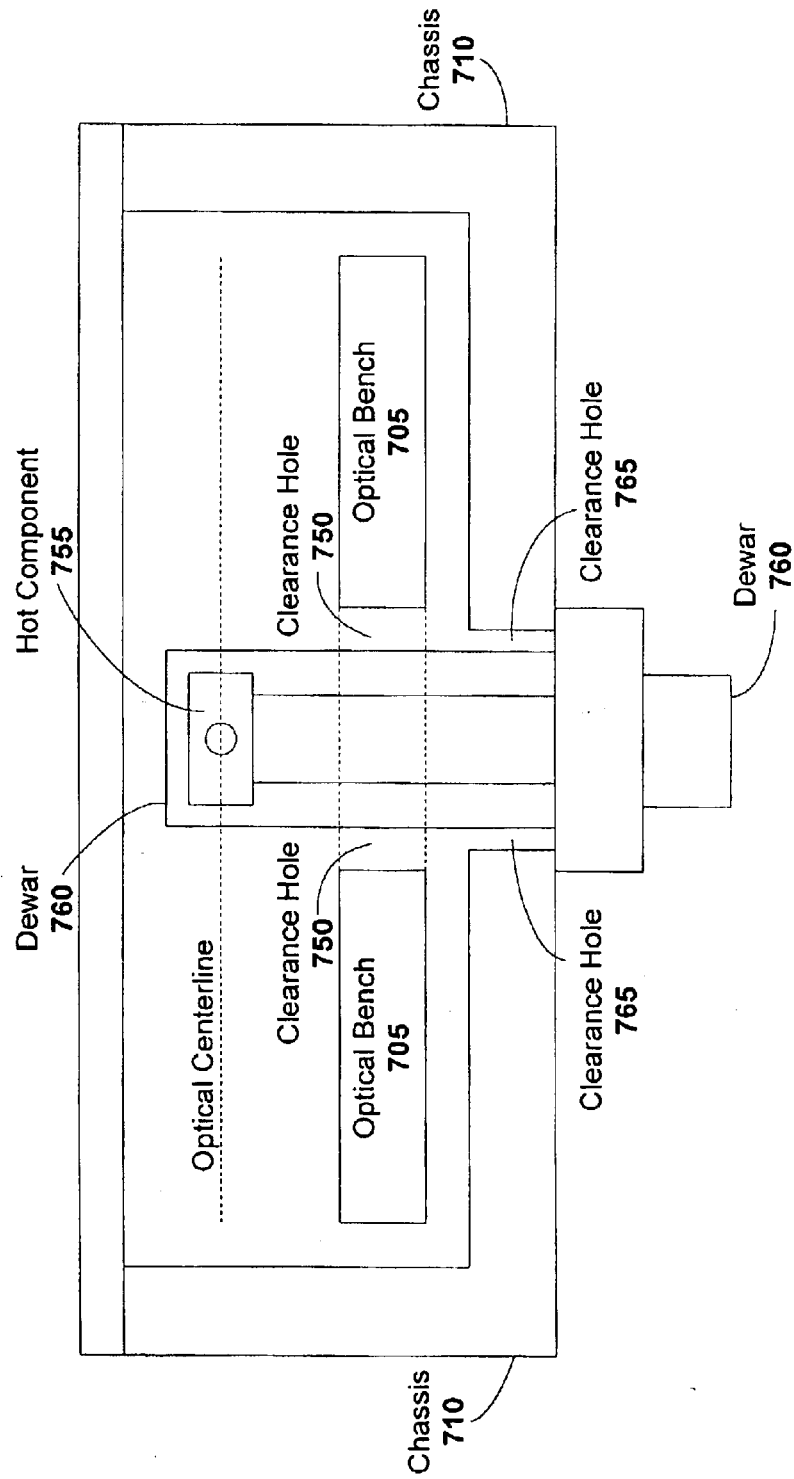
FIG. 7 illustrates a chassis mounted laser crystal floating with respect to the optical bench with a cryo-cooler dewar for cooling in accordance with an embodiment of the present invention.

FIG. 7 illustrates a side view of a chassis mounted laser crystal floating with respect to the optical bench with a cryo-cooler dewar for cooling in accordance with an embodiment of the present invention. As can be seen, there is a clearance hole 750 in optical bench 705, as well as a clearance hole 765 in chassis 710. A dewar 760 is effectively plugged into the hole 765, and can be sealed into place with an o'ring. A hot component 755 is bonded to the cold finger of the dewar 760, and is under the dewar vacuum. The hot component 755 might be, for example, a laser crystal, a pump diode, or any heat generating device.

A heat pump/exchanger could be operatively coupled to the dewar 760 to remove the heat drawn from the hot component 755. Note that component 755 is not in direct contact with the bench 705. Further note that the plug-type dewar arrangement operates to protect the optical bench from the external environment conditions by virtue of the plugged hole 765.

Thermal Conducting Straps and Mounts

Figure 8:
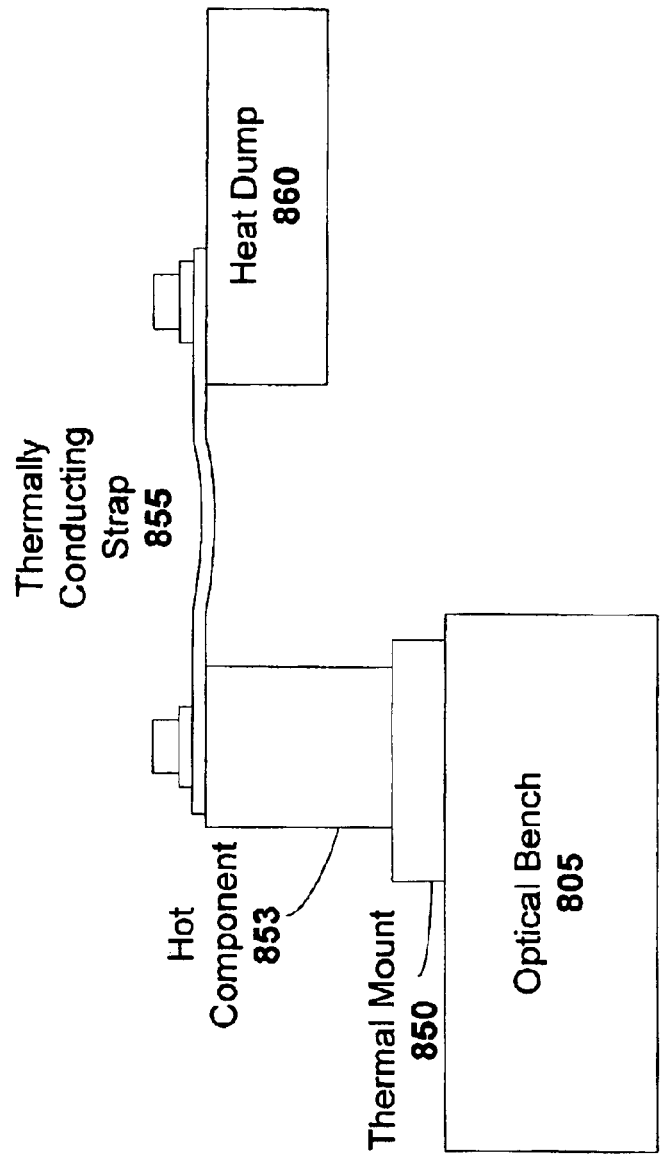
FIG. 8 illustrates how heat can be removed from components on the optical bench by using thermally conducting straps to transfer unwanted heat to a heat dump in accordance with an embodiment of the present invention.

FIG. 8 illustrates another thermal load management technique, where heat is removed from hot components on an optical bench by using thermally conducting straps to transfer unwanted heat to a heat dump in accordance with an embodiment of the present invention.

In this example, a hot component 853 is mounted on optical bench 805 (could also be mounted on a chassis). Hot component 853 might be, for example, an acousto-optic Q-switch or a crystal oven. A thermally conducting strap 855 is thermally coupled to the component 853 (in this case by a metallic fastener), and transfers the heat dissipated by the component 853 to a heat dump or heat exchanger 860. The dump/exchanger 860 can be located, for example, on the bench's chassis or elsewhere. An interface material, such as silver filled epoxy, can be applied at the connections where the strap 855 contacts component 853 and the heat dump 860, so as to decrease interface losses associated with those connections.

The base of the hot item 853 can be attached to bench 805 via a thermal mount 850, allowing for some heat to go into bench 805, when allowable or so desired. Multiple straps can be used to increase total heat conduction. Machined flexures that plastically yield can be used as well. Likewise, a heat pipe can be substituted for strap 855 to achieve very low temperature differences. However, note that heat pipes are generally much stiffer than a strap. Tradeoffs between mechanical stress and thermal resistance must be considered when using heat pipes to dissipate heat of a hot component in a given application.

Compensating Heat Source

A compensating heat source may be strategically placed on the optical bench or chassis to bring the system into balance. Placement location and wattage of the compensating heat source will depend on the particular application, and will be apparent in light of this disclosure.

For example, a compensating heat source can be used to balance out the heat load provided by a laser crystal located on one edge of an optical bench wall. The compensating heat source can be placed along the opposite edge of that bench wall, similar to the thermal balancing discussed in reference to FIG. 5, where a pair of laser crystals provide the thermal balance.

The foregoing description of the embodiments of the invention has been presented for the purposes of illustration and description. It is not intended to be exhaustive or to limit the invention to the precise form disclosed. Many modifications and variations are possible in light of this disclosure. For example, a pseudo semi-kinematic mounting scheme in accordance with the principles of the present invention might include three flexure devices that are machined to provide a specific constraint configuration. Likewise, various constraint configurations in accordance with the principles of the present invention, but that provide less than six degrees of freedom are also possible. It is intended that the scope of the invention be limited not by this detailed description, but rather by the claims appended hereto.

What is claimed is:

1. A system for mounting a laser's optical bench to a chassis, the system comprising:

a first pseudo semi-kinematic sub-mount that is adapted to constrain the optical bench in at least one translational direction;

a second pseudo semi-kinematic sub-mount that is adapted to constrain the optical bench in two translational directions; and a third pseudo semi-kinematic sub-mount that is adapted to constrain the optical bench in at least two translational directions;

wherein the first, second, and third pseudo semi-kinematic sub-mounts operate together to constrain the optical bench in six degrees of freedom, and to provide a pseudo semi-kinematic mount that is substantially free of point and line contact loading.

2. The system of claim 1 wherein the first pseudo semi-kinematic sub-mount constrains the optical bench in one translational direction, and the third pseudo semi-kinematic sub-mount constrains the optical bench in three translational directions.

3. The system of claim 1 wherein the first pseudo semi-kinematic sub-mount constrains the optical bench in the Z translational direction, the second pseudo semi-kinematic sub-mount constrains the optical bench in the X and Z translational directions, and the third pseudo semi-kinematic sub-mount constrains the optical bench in the X, Y and Z translational directions.

4. The system of claim 1 wherein the first pseudo semi-kinematic sub-mount constrains the optical bench in two translational directions, and the third pseudo semi-kinematic sub-mount constrains the optical bench in two translational directions.

5. The system of claim 1 wherein each of the first, second, and third pseudo semi-kinematic sub-mounts constrains the optical bench in the X and Y translational directions.

6. The system of claim 1 wherein at least one of the pseudo semi-kinematic sub-mounts includes an optical bench mounting pad in surface contact with a chassis mounting pad so that one or both of the pads can slide with respect to the other.

7. The system of claim 1 wherein at least one of the pseudo semi-kinematic sub-mounts includes a first optical bench mounting pad in surface contact with a first chassis mounting pad so that one or both of the first pads can slide with respect to the other, and further includes a second mounting pad that is perpendicular to the first pads for providing a second translational constraint.

8. The system of claim 7 wherein the at least one pseudo semi-kinematic sub-mount further includes a third mounting pad for providing a third translational constraint.

9. The system of claim 1 wherein at least one of the pseudo semi-kinematic sub-mounts includes a flexure device that constrains the optical bench in two or more translational directions and provides at least one degree of rotational freedom.

10. The system of claim 1 wherein at least one of the pseudo semi-kinematic sub-mounts includes a spring-loaded bolt fed through a clearance hole or slot and secured in a threaded hole.

11. The system of claim 1 wherein at least one of the pseudo semi-kinematic sub-mounts includes a Teflon shim to reduce friction between contacting surfaces.

12. A system for mounting a laser's optical bench to a chassis, the system comprising:
    a first pseudo semi-kinematic sub-mount including a first optical bench mounting pad in surface contact with a first chassis mounting pad so that at least one flat contact surface of one or both of the first pads can slide with respect to the other;
    a second pseudo semi-kinematic sub-mount including a second optical bench mounting pad in surface contact with a second chassis mounting pad so that at least one flat contact surface of one or both of the second pads can slide with respect to the other; and
    a third pseudo semi-kinematic sub-mount that is adapted to constrain the optical bench in at least two translational directions;
    wherein the first, second, and third pseudo semi-kinematic sub-mounts operate together to provide a pseudo semi-kinematic mount that is substantially free of point and line contact loading.

13. The system of claim 12 wherein the first, second, and third pseudo semi-kinematic sub-mounts operate together to constrain the optical bench in six degrees of freedom.

14. A method for assembling a laser system including an optical bench adapted for mounting in a chassis, the method comprising:
    constraining the optical bench in the chassis in at least one translational direction with a first pseudo semi-kinematic sub-mount;
    constraining the optical bench in the chassis in two translational directions with a second pseudo semi-kinematic sub-mount; and
    constraining the optical bench in the chassis in at least two translational directions with a third pseudo semi-kinematic sub-mount;
    wherein the first, second, and third pseudo semi-kinematic sub-mounts operate together to constrain the optical bench in six degrees of freedom, and to provide a pseudo semi-kinematic mount that is substantially free of point and line contact loading.

15. The method of claim 14 further comprising:
    mounting a pair of hot elements on an outside wall and on opposite faces of the optical bench to balance thermal load on the bench.

16. The system of claim 15 wherein mounting the pair of hot elements includes mounting at least one of a laser crystal, a compensating heat source, and a pump diode.

17. The method of claim 14 further comprising:
    mounting a hot element on the optical bench in a thermally dammed area, thereby forcing heat load from the hot element to exit to a known area of the optical bench.

18. The method of claim 17 further comprising:
    providing a heat dumping mechanism at the known area to dissipate the heat load.

19. The method of claim 14 further comprising:
    mounting a hot component of the optical bench on a cooling device; and
    plugging the cooling device into a chassis hole and through a clearance hole in the optical bench.

20. The method of claim 14 further comprising:
    providing a heat strap to transfer unwanted heat to a heat dump.

* * * * *